United States Patent
Trant et al.

(10) Patent No.: US 11,626,750 B2
(45) Date of Patent: Apr. 11, 2023

(54) INTEGRATED UNINTERRUPTIBLE POWER SUPPLIES FOR APPLIANCES

(71) Applicant: Rheem Manufacturing Company, Atlanta, GA (US)

(72) Inventors: Troy Trant, Montgomery, AL (US); Robert D. Brown, Rolla, MO (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 17/717,280

(22) Filed: Apr. 11, 2022

(65) Prior Publication Data
US 2022/0239145 A1  Jul. 28, 2022

Related U.S. Application Data

(63) Continuation of application No. 16/243,556, filed on Jan. 9, 2019, now Pat. No. 11,303,148.

(51) Int. Cl.
*H02J 9/06* (2006.01)
*F24H 1/10* (2022.01)
(Continued)

(52) U.S. Cl.
CPC .............. *H02J 9/061* (2013.01); *F24H 1/101* (2013.01); *H02J 7/0068* (2013.01); *F24D 18/00* (2022.01);
(Continued)

(58) Field of Classification Search
CPC ...... H02J 9/061; H02J 7/0068; H02J 2310/20; H02J 9/06; F24H 1/101; F24H 2240/01;
(Continued)

(56) References Cited

U.S. PATENT DOCUMENTS

| 6,104,104 A | 8/2000 | Kuroki |
| 2005/0052085 A1 | 3/2005 | Chang et al. |

(Continued)

FOREIGN PATENT DOCUMENTS

| CN | 108775574 A | 11/2018 |
| JP | 2013088083 A | 5/2013 |

(Continued)

OTHER PUBLICATIONS

International Search Report of International Application No. PCT/US2020/012688 dated Apr. 3, 2020. (One page).

(Continued)

*Primary Examiner* — Richard Tan
(74) *Attorney, Agent, or Firm* — Eversheds Sutherland (US) LLP

(57) ABSTRACT

A water heater can include a housing and a heating system disposed within the housing, where the heating system is configured to heat a fluid. The water heater can also include a switch coupled to the heating system, where the switch operates between a first position during normal operations and a second position during an outage. The water heater can further include a primary power source coupled to the switch, where the primary power source is configured to provide primary power to the heating system through the switch during the normal operations. The water heater can also include an uninterruptible power supply (UPS) coupled to the switch, where the UPS is configured to provide reserve power to the heating system through the switch during the outage, and where the UPS is integrated with the housing.

19 Claims, 9 Drawing Sheets

(51) Int. Cl.
*H02J 7/00* (2006.01)
*F24D 103/13* (2022.01)
*F24D 101/40* (2022.01)
*F24D 18/00* (2022.01)

(52) U.S. Cl.
CPC ...... *F24D 2101/40* (2022.01); *F24D 2103/13* (2022.01); *F24H 2240/01* (2013.01)

(58) Field of Classification Search
CPC ...... F24H 1/124; F24D 18/00; F24D 2101/40; F24D 2103/13
USPC .......................................................... 392/480
See application file for complete search history.

(56) References Cited

U.S. PATENT DOCUMENTS

| | | |
|---|---|---|
| 2006/0267409 A1 | 11/2006 | Mullet et al. |
| 2008/0247760 A1 | 10/2008 | Edmon et al. |
| 2010/0020475 A1 | 1/2010 | Spitaels et al. |
| 2012/0060827 A1 | 3/2012 | Roetker |
| 2013/0224562 A1 | 8/2013 | Momo |
| 2016/0056666 A1 | 2/2016 | Choi et al. |
| 2016/0197504 A1 | 7/2016 | Hsia et al. |
| 2018/0034299 A1 | 2/2018 | Seman, Jr. et al. |
| 2018/0106501 A1 | 4/2018 | Hinton et al. |
| 2018/0233947 A1* | 8/2018 | Mills .................... H02J 9/06 |
| 2019/0341793 A1 | 11/2019 | Chien |

FOREIGN PATENT DOCUMENTS

| | | |
|---|---|---|
| RU | 2008111287 A | 9/2009 |
| RU | 168895 A | 2/2017 |

OTHER PUBLICATIONS

Supplementary European Search Report of European Application No. 20738593 dated Sep. 9, 2022.

* cited by examiner

INTEGRATED UNINTERRUPTIBLE POWER SUPPLIES FOR APPLIANCES

CROSS-REFERENCE TO RELATED APPLICATIONS

The present application is a continuation application of U.S. patent application Ser. No. 16/243,556 filed Jan. 9, 2019, the entire contents of which is incorporated herein by reference.

TECHNICAL FIELD

The present disclosure relates generally to water heaters, and more particularly to systems, methods, and devices for providing integrated uninterruptible power supplies (UPSs) for appliances (e.g., water heaters).

BACKGROUND

Water heaters are generally used to provide a supply of heated water. Water heaters can be used in a number of different residential, commercial, and industrial applications. A water heater can supply hot water to a number of different processes. For example, a hot water heater in a residential dwelling can be used for an automatic clothes washer, an automatic dishwasher, one or more showers, and one or more sink faucets. Some water heaters include tanks to store hot water. Other water heaters are tankless and provide hot water on demand. While some water heaters use natural gas as opposed to electricity to heat water, all water heaters need electricity to operate.

SUMMARY

In general, in one aspect, the disclosure relates to a water heater that includes a housing and a heating system disposed within the housing, where the heating system is configured to heat a fluid. The water heater can also include a switch coupled to the heating system, where the switch operates between a first position during normal operations and a second position during an outage. The water heater can further include a primary power source coupled to the switch, where the primary power source is configured to provide primary power to the heating system through the switch during the normal operations. The water heater can also include an uninterruptible power supply (UPS) coupled to the switch, where the UPS is configured to provide reserve power to the heating system through the switch during the outage. The UPS can be integrated with the housing.

In another aspect, the disclosure can generally relate to an appliance that includes a housing and an appliance system disposed, at least in part, within the housing, where the appliance system is configured to perform a function for which the appliance is designed. The appliance can also include a switch coupled to the appliance system, where the switch operates between a first position during normal operations and a second position during an outage. The appliance can further include a primary power source coupled to the switch, where the primary power source is configured to provide primary power to the appliance system through the switch during the normal operations. The appliance can also include an uninterruptible power supply (UPS) coupled to the switch, where the UPS is configured to provide reserve power to the appliance system through the switch during the outage. The UPS can be integrated with the housing.

In yet another aspect, the disclosure can generally relate to a method for providing reserve power by an uninterruptible power supply (UPS) to a tankless water heater. The method can include storing, by the UPS, reserve power during normal operation of the tankless water heater. The method can also include receiving a first signal signifying that the normal operation is ended and that an outage is beginning. The method can further include delivering, by the UPS through a switch, the reserve power to a heating system of the tankless water heater, where the switch closes to allow the reserve power to flow to the heating system when the first signal is received. The method can also include receiving a second signal signifying that the outage is ended and that the normal operation is resuming. The method can further include resuming storing, by the UPS, the reserve power during the normal operation, where the switch is open during the normal operation to prevent the UPS from delivering the reserve power to the heating system during the normal operation.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
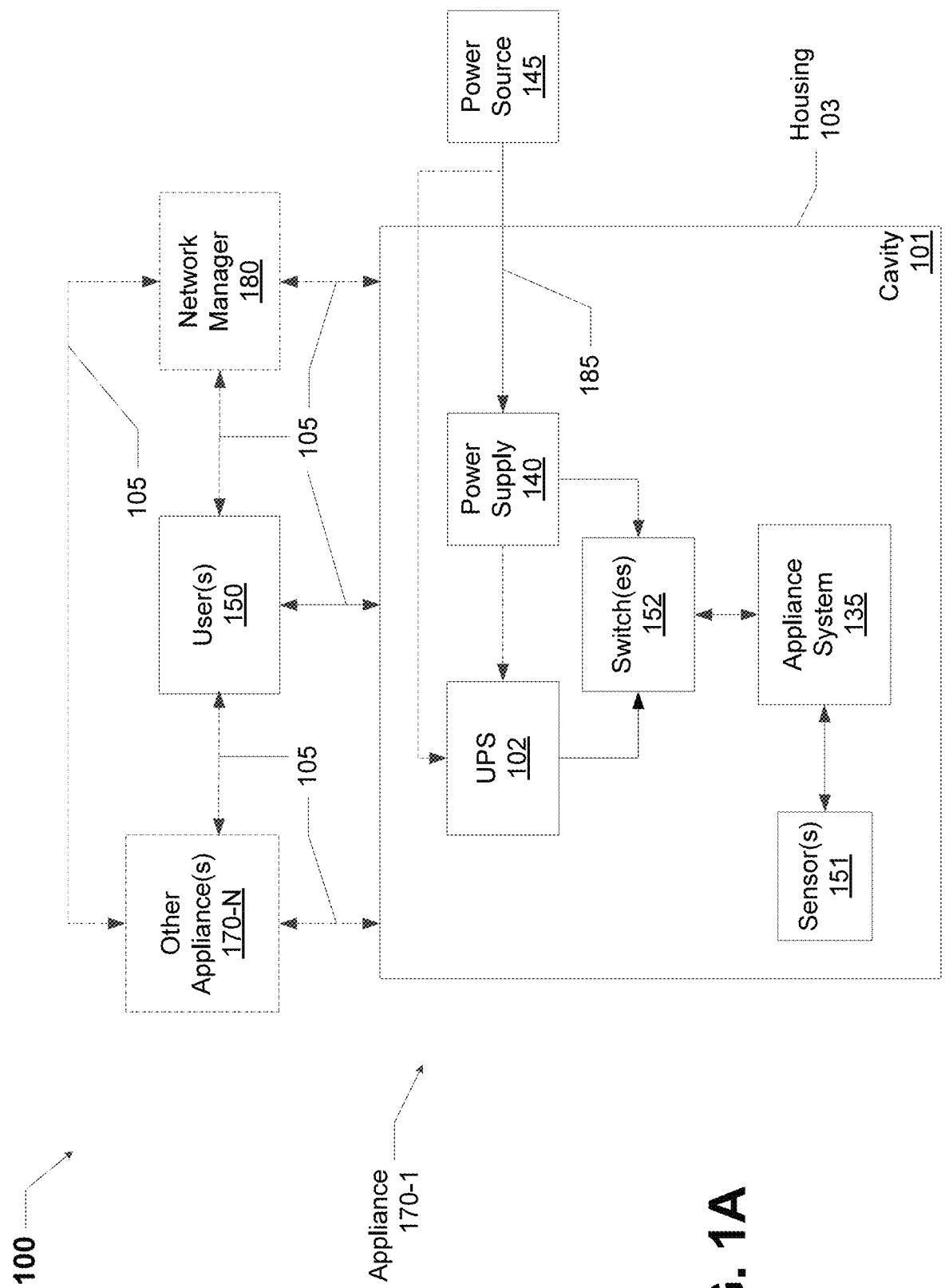
FIGS. 1A and 1B show diagrams of a system that includes a tank-based water heater and a controller in accordance with certain example embodiments.

In general, example embodiments provide systems, methods, and devices for integrated UPSs for appliances. Example embodiments can be used for any number, type, and/or size (e.g., capacity) of water heater. For example, example embodiments can be used with tank-based water heaters, not only tankless water heaters. As another example, a UPS integrated with one water heater can also supply reserve power to one or more other water heaters. As still another example, example embodiments can be used with heat pump water heaters.

In some cases, example UPSs can be integrated with and/or provide reserve power to one or more other appliances (e.g., washing machine, dishwasher, microwave oven, toaster) and/or electrical devices (e.g., television, clock, desktop computer) aside from water heaters. Further, example embodiments can be located in any type of environment (e.g., warehouse, attic, garage, storage, mechanical room, basement) for any type (e.g., commercial, residential, industrial) of user. Water heaters used with example embodiments can be used for one or more of any number of equipment or systems (e.g., automatic clothes washers, automatic dishwashers, showers, sink faucets, heating systems, humidifiers), which are also called heated water demands.

Water heater systems (or components thereof, including controllers) described herein can be made of one or more of a number of suitable materials to allow example UPSs and/or other associated components of a system to meet certain standards and/or regulations while also maintaining durability in light of the one or more conditions under which the devices and/or other associated components of the system can be exposed. Examples of such materials can include, but are not limited to, aluminum, stainless steel, copper, fiberglass, glass, plastic, PVC, ceramic, and rubber.

Components of a water heater system (or portions thereof, such as an example UPS) described herein can be made from a single piece (as from a mold, injection mold, die cast, or extrusion process). In addition, or in the alternative, components of a water heater system (or portions thereof) can be made from multiple pieces that are mechanically coupled to each other. In such a case, the multiple pieces can be mechanically coupled to each other using one or more of a number of coupling methods, including but not limited to epoxy, welding, soldering, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

When water heaters that include example UPSs are storage-type water heaters, such water heaters have a rated capacity (also sometimes called a nameplate capacity) and an actual capacity. These capacities are with respect to the tank of the water heater, as described below. In many cases, the actual capacity is less than the rated capacity. For example, a storage-type electric water heater with a rated capacity of 50 gallons can have an actual capacity of 37.5 gallons. The actual capacity is the amount of hot water that a tank can hold. The actual capacity can vary based on one or more of a number of factors, including but not limited to the configuration of heating elements, the energy source (e.g., electricity, natural gas) used for the heating system, and the construction of the tank. Similarly, tankless water heaters can have a rated capacity. Such a capacity is usually stated in volume per unit time (e.g., gallons per minute).

Reserve power provided to one or more appliances by an example UPS, as described herein, occurs during an outage of a primary source of power (e.g., a power source, a power supply). An outage can be voluntary or involuntary. An involuntary outage is where the primary source of power is unavailable due to some outside event (e.g., a tripped breaker on a distribution system feeding a home). A voluntary outage is where the primary source of power is available, but a decision is made (e.g., due to economic or market conditions), according to example embodiments, to use reserve power from the UPS instead of the primary source of power.

In the foregoing figures showing example embodiments of UPSs integrated with appliances, one or more of the components shown may be omitted, repeated, and/or substituted. Accordingly, example embodiments of UPSs integrated with appliances should not be considered limited to the specific arrangements of components shown in any of the figures. For example, features shown in one or more figures or described with respect to one embodiment can be applied to another embodiment associated with a different figure or description.

In addition, if a component of a figure is described but not expressly shown or labeled in that figure, the label used for a corresponding component in another figure can be inferred to that component. Conversely, if a component in a figure is labeled but not described, the description for such component can be substantially the same as the description for a corresponding component in another figure. Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein. The numbering scheme for the various components in the figures herein is such that each component is a three or four digit number, and corresponding components in other figures have the identical last two digits.

In some cases, water heaters (or other appliances or electrical devices) that have example UPSs integrated therewith can be subject to meeting certain standards and/or requirements. Examples of entities that set and/or maintain standards include, but are not limited to, the Department of Energy (DOE), the National Electric Code (NEC), the National Electrical Manufacturers Association (NEMA), the International Electrotechnical Commission (IEC), the American Society of Mechanical Engineers (ASME), the National Fire Protection Association (NFPA), the American Society of Heating, Refrigeration and Air Conditioning Engineers (ASHRAE), Underwriters' Laboratories (UL), and the Institute of Electrical and Electronics Engineers (IEEE). Use of example embodiments described herein meet (and/or allow a corresponding water heater system or portion thereof to meet) such standards when required.

Example embodiments of UPSs integrated with appliances will be described more fully hereinafter with reference to the accompanying drawings, in which example embodiments of UPSs integrated with appliances are shown. UPSs integrated with appliances may, however, be embodied in many different forms and should not be construed as limited to the example embodiments set forth herein. Rather, these example embodiments are provided so that this disclosure will be thorough and complete, and will fully convey the scope of UPSs integrated with appliances to those of ordinary skill in the art. Like, but not necessarily the same, elements (also sometimes called components) in the various figures are denoted by like reference numerals for consistency.

Terms such as "first", "second", "third", "top", "bottom", "side", "front", "rear", and "within" are used merely to distinguish one component (or part of a component or state of a component) from another. Such terms are not meant to denote a preference or a particular orientation, and are not meant to limit embodiments of UPSs integrated with appliances. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
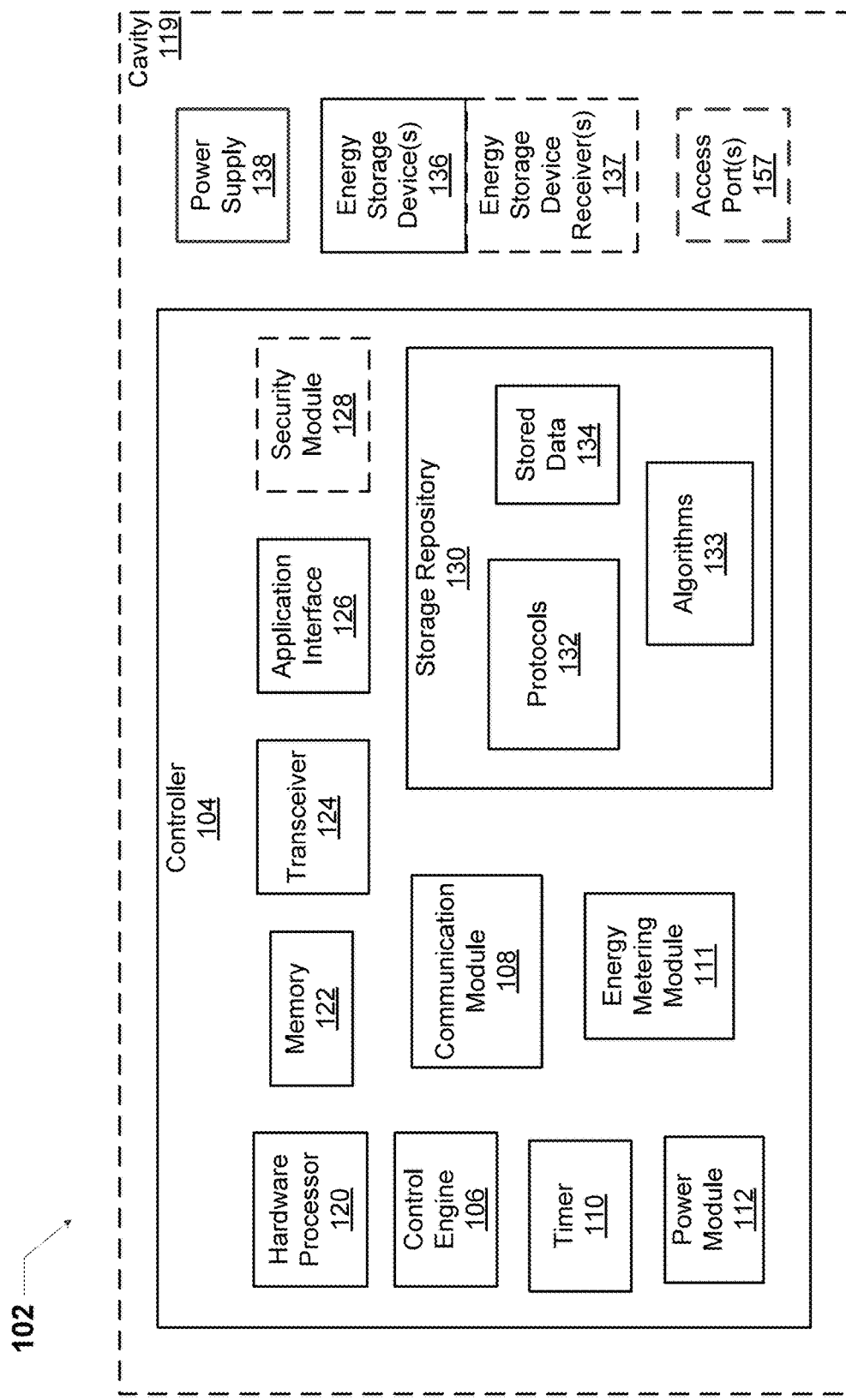

FIGS. 1A and 1B show diagrams of a system 100 of a water heating system that includes an appliance 170-1 that includes a UPS 102 in accordance with certain example embodiments. Specifically, FIG. 1A shows the system 100, and FIG. 1B shows a detailed system diagram of the UPS 102. As shown in FIGS. 1A and 1B, the system 100 can include the appliance 170-1, one or more users 150, a power source 145, an optional network manager 180, and one or more other optional appliances 170-1. The appliance 170-1 of FIG. 1A includes an appliance system 135, one or more sensor devices 151 (also sometimes called sensor modules or sensors), the UPS 102, a power supply 140, and one or more switches 152.

As shown in FIG. 1B, the UPS 102 can include one or more of a number of components. Such components, can include, but are not limited to, a controller 104, one or more energy storage devices 136, one or more access ports 157, one or more optional energy storage device receivers 137, and a power supply 138. The controller 104 of the UPS 102 can also include one or more of a number of components. For example, as shown in FIG. 1B, the controller 104 includes a control engine 106, a communication module 108, a timer 110, an energy metering module 111, a power module 112, a storage repository 130, a hardware processor 120, a memory 122, a transceiver 124, an application interface 126, and, optionally, a security module 128. The components shown in FIGS. 1A and 1B are not exhaustive, and in some embodiments, one or more of the components shown in FIGS. 1A and 1B may not be included in an example system. Further, one or more components shown in FIGS. 1A and 1B can be rearranged. For example, some or all of the inlet line 127 can be part of the appliance 170-1. Any component of the example system 100 can be discrete or combined with one or more other components of the system 100.

A user 150 may be any person or entity that interacts with the appliance 170-1 (including the example UPS 102), one or more of the other optional appliances 170N, and/or the network manager 180. Examples of a user 150 may include, but are not limited to, an engineer, an appliance (e.g., other optional appliance 170-N), a process that uses heated water, an electrician, an instrumentation and controls technician, a mechanic, an operator, a consultant, an electric utility, a grid operator, a retail electric provider, an energy marketing company, load forecasting software, a weather forecasting service, a network manager, a labor scheduling system, a contractor, a homeowner, a landlord, a building management company, and a manufacturer's representative. There can be one or multiple users 150. In some cases, the system 100 can operate without a user 150, making the user 150 optional.

When the system 100 includes a user 150, the user 150 can use a user system (not shown), which may include a display (e.g., a GUI). The user 150 can interact with (e.g., sends data to, receives data from) the UPS 102 (or portions thereof) via the application interface 126 (described below). The user 150 (with or without a user system) can also interact with one or more optional appliances 170-N and/or the optional network manager 180. Interaction between the user 150, the appliance 170-1, and the power supply 135 is conducted using signal transfer links 105 and/or power transfer links 185.

Each signal transfer link 105 and each power transfer link 185 can include wired (e.g., Class 1 electrical cables, Class 2 electrical cables, electrical connectors, electrical conductors, electrical traces on a circuit board, power line carrier, DALI, RS485) and/or wireless (e.g., Wi-Fi, visible light communication, Zigbee, mobile apps, text/email messages, cellular networking, Bluetooth, WirelessHART, ISA100, inductive) technology. For example, a signal transfer link 105 can be (or include) one or more electrical conductors that are coupled to the UPS 102 of the appliance 170-1 and a user 150. A signal transfer link 105 can transmit signals (e.g., communication signals, control signals, data) between the optional network manager 180, a user 150, the appliance 170-1 (including components thereof, such as the UPS 102), and/or one or more optional other appliances 170-N.

Similarly, a power transfer link 185 can transmit power between the power supply 140, the power source 145, the switches 152, the appliance system 135, and optionally the UPS 102. One or more signal transfer links 105 and/or one or more power transfer links 185 can also transmit signals and power, respectively, between components (e.g., the switches 152, the appliance system 135, the one or more sensors 151) within the appliance 170-1.

The power source 145 provides power, directly or indirectly, to the power supply 140 and, optionally, the UPS 102 of the appliance 170-1. The power provided by the power source 145 of the system 100 provides of a type (e.g., AC, DC) and level (e.g., 240V, 120V) that can be used by the appliance 170-1, as well as, in some cases, to one or more other components (e.g., the network manager 480, one or more other appliances 170N, a user 150) of the system 100. The power source 145 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 145 can be, or include, for example, a wall outlet, an energy storage device (e.g. a battery, a supercapacitor), a circuit breaker, and/or an independent source of generation (e.g., a photovoltaic solar generation system). The power source 145 can also include one or more components (e.g., a switch, a relay, a controller) that allow the power source 145 to communicate with and/or follow instructions from the user 150, the appliance 170-1, and/or the network manager 180

The optional network manager 180 of the system 100 of FIG. 1A is a device or component that controls all or a portion of a communication network that includes the various appliances 170 (e.g., appliance 170-1) and its various components. The network manager 180 can also communicate with the user 150. In some cases, the network manager 180 can also communicate with the power source 145. Such communications can be facilitated using signal transfer links 105 and/or power transfer links 185. If there is no network manager 180, the controller 104 of the UPS 102 and/or a controller within an appliance system 135 can be established or designated as a master controller of the system 100 and serve the role of the network manager 180.

The network manager 180 can be substantially similar to the controller 104 discussed below. Alternatively, the network manager 180 can include one or more of a number of features in addition to, or altered from, the features of the controller 104 described below. In addition to direct communication between the network manager 180 and other components (e.g., a user 150) of the system 100, the network manager 180 can facilitate communication between components of the system 100. The network manager 180 can serve to communicate and coordinate with any and all components (or portions thereof) in the system 100.

Each of the optional other appliances 170-N can be substantially similar to, or different than, the appliance 170-1. For example, an optional other appliance 170-N can include one or more components (e.g., switch 152, UPS 102, appliance system 135) that are shown and described below with respect to the appliance 170-1. In some cases, an optional other appliance 170-N has one or more additional components or one or more fewer components compared to what is shown and described below with respect to the appliance 170-1. In some case, one or more components of the appliance 170-1 can be shared with one or more optional other appliances 170-N.

An appliance 170 in the system 100 can be any device that uses electricity to provide some function or service. Examples of an appliance 170 can include, but are not limited to, a tankless water heater, a tank-based water heater, a gas-fired furnace, a sump pump, a well pump, a fireplace insert, a portable air-conditioning unit, a dehumidifier, an induction burner, a fan, a dishwasher, a clothes washer, a clothes dryer, a portable oven, a refrigerator, a freezer, an air purifier, and a microwave oven.

The controller 104 of the UPS 102, the controller of an appliance system 135 of the appliance 170-1, a controller of an optional other appliance 170-N, a user 150, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The appliance 170-1 can include a housing 103. The housing 103 can include at least one wall that forms a cavity 101. In some cases, the housing 103 can be designed to comply with any applicable standards so that the appliance 170-1 can be located in a particular environment (e.g., a hazardous environment). For example, if the appliance 170-1 is located in a humid environment, the housing 103 can be designed to comply with applicable industry standards for such a humid environment.

The housing 103 of the appliance 170-1 can be used to house one or more components of the appliance 170-1, including one or more components of the controller 104. For example, as shown in FIG. 1A, the UPS 102, including the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the one or more switches 152, the sensors 151, and the appliance system 135 are disposed in the cavity 101 formed by the housing 103. In alternative embodiments, any one or more of these or other components of the appliance 170-1 can be disposed on the housing 103 and/or remotely from the housing 103.

The one or more sensors 151 can be any type of sensing device that measures one or more parameters. Examples of types of sensors 151 can include, but are not limited to, a passive infrared sensor, a photocell, a differential pressure sensor, a humidity sensor, a pressure sensor, a flow meter, a gas detector, and a resistance temperature detector. Parameters that can be measured by a sensor 151 can include, but are not limited to, flow rate, movement, pressure, ambient light, infrared light, temperature, humidity, and ambient temperature. The parameters measured by the sensors 151 can be used by the controller 104 of the appliance system 135 to operate the appliance system 135. A sensor 151 can receive power and/or control signals from the power source 140 and/or one or more other sources of power.

The appliance system 135 of the appliance 170-1 performs the function of the appliance 170-1. The appliance system 135 of the appliance 170-1 can include devices and/or components that are found in the appliance 170-1 and/or are used to allow the appliance 170-1 to operate. A component or device of an appliance system 135 can be electrical, electronic, mechanical, or any combination thereof. The appliance 170-1 can have one or more of any number and/or type of components and/or devices in the appliance system 135. For example, when the appliance 170-1 is a tankless water heater, examples of components in the appliance system 135 can include, but are not limited to, an air moving device, a heat exchanger, a valve, a heat sink, an electrical conductor or electrical cable, a terminal block, a baffle, piping, fittings, a vent pipe, a control panel, and a circuit board.

The switches 152 control continuity between the appliance system 135 and either the UPS 102 or the power supply 140. Each switch 152 can be a single switch device or a number of switch devices arranged in series and/or in parallel with each other. The switch 152 determines whether the UPS 102 or the power supply 140 is coupled to the appliance system 135 at any particular point in time. A switch 152 can have one or more contacts, where each contact has an open state and a closed state (position). In the open state, a contact of the switch 152 creates an open circuit, which prevents the appliance system 135 from delivering and/or receiving power and/or a communication signal with respect to the component (e.g., the UPS 102, the power supply 140) electrically coupled to that contact of the switch 152.

In the closed state, a contact of the switch 152 creates a closed circuit, which allows the appliance system 135 to deliver and/or receive power and/or communication signals with respect to the component (e.g., the UPS 102, the power supply 140) electrically coupled to that contact of the switch 152. In certain example embodiments, the position of each contact of the switch 152 is controlled by the control engine 106 of the controller 104. Alternatively, the position of each contact of the switch 152 can be controlled by a component (e.g., a controller) of the appliance system 135.

If the switch 152 is a single device, the switch 152 can have a single contact or have multiple contacts. In any case, only one contact of the switch 152 can be active (closed) at any point in time in certain example embodiments. Consequently, when one contact of the switch 152 is closed, all other contacts of the switch 152 are open in such example embodiments. For example, if the power supply 140 is supplying power at a point in time, the switch 152 is configured to allow the power supply 140 to deliver power (also called primary power) to the appliance system 135 and to prevent the UPS 102 from delivering power (also called reserve power) to the appliance system 135. Conversely, when the power supply 140 is not supplying power (e.g., due to an outage) at a point in time, the switch 152 is configured to prevent the power supply 140 from delivering primary power to the appliance system 135 and allows the UPS 102 to deliver reserve power to the appliance system 135.

The power supply 140 of the appliance 170-1 provides power to the appliance system 135 through the switch 152 during normal operating conditions. The power supply 140 can be substantially the same as, or different than, the power module 112 of the controller 104 (described below) and/or the power source 145 described above. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from the power source 145 and delivers primary power through the switch 152 to the appliance system 135. The power supply 140 can generate power of a type (e.g., alternating current, direct current) and level (e.g., 12V, 24V, 120V) that can be used by the appliance system 135 and its various components. In some cases, the power supply 140 can include a source of power in itself. For example, the power supply 140 can include a battery, a localized photovoltaic power system, or some other source of independent power.

As discussed above, the UPS 102 can include one or more of a number of components. For example, as shown in FIG. 1B, the UPS 102 can include a controller 104, one or more energy storage devices 136, one or more optional energy storage device receivers 137, one or more optional access ports 157, and a power supply 138. The UPS 102 can include an optional housing 139. The housing 139 can include at least one wall that forms a cavity 119. In some cases, the housing 139 can be designed to comply with any applicable standards so that the UPS 102 can be located in a particular environment (e.g., a hazardous environment). For example, if the UPS 102 is located in humid environment, the housing 139 can be designed to comply with applicable industry standards for such a humid environment.

The housing 139 of the UPS 102 can be used to house one or more components of the UPS 102, including one or more components of the controller 104. For example, as shown in FIG. 1B, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 138, the one or more access ports 157, the one or more energy storage devices 136, and the one or more energy storage device receivers 137 are disposed in the cavity 119 formed by the housing 139. In alternative embodiments, any one or more of these or other components of the UPS 102 can be disposed on the housing 139 and/or remotely from the housing 139.

Figure 4:
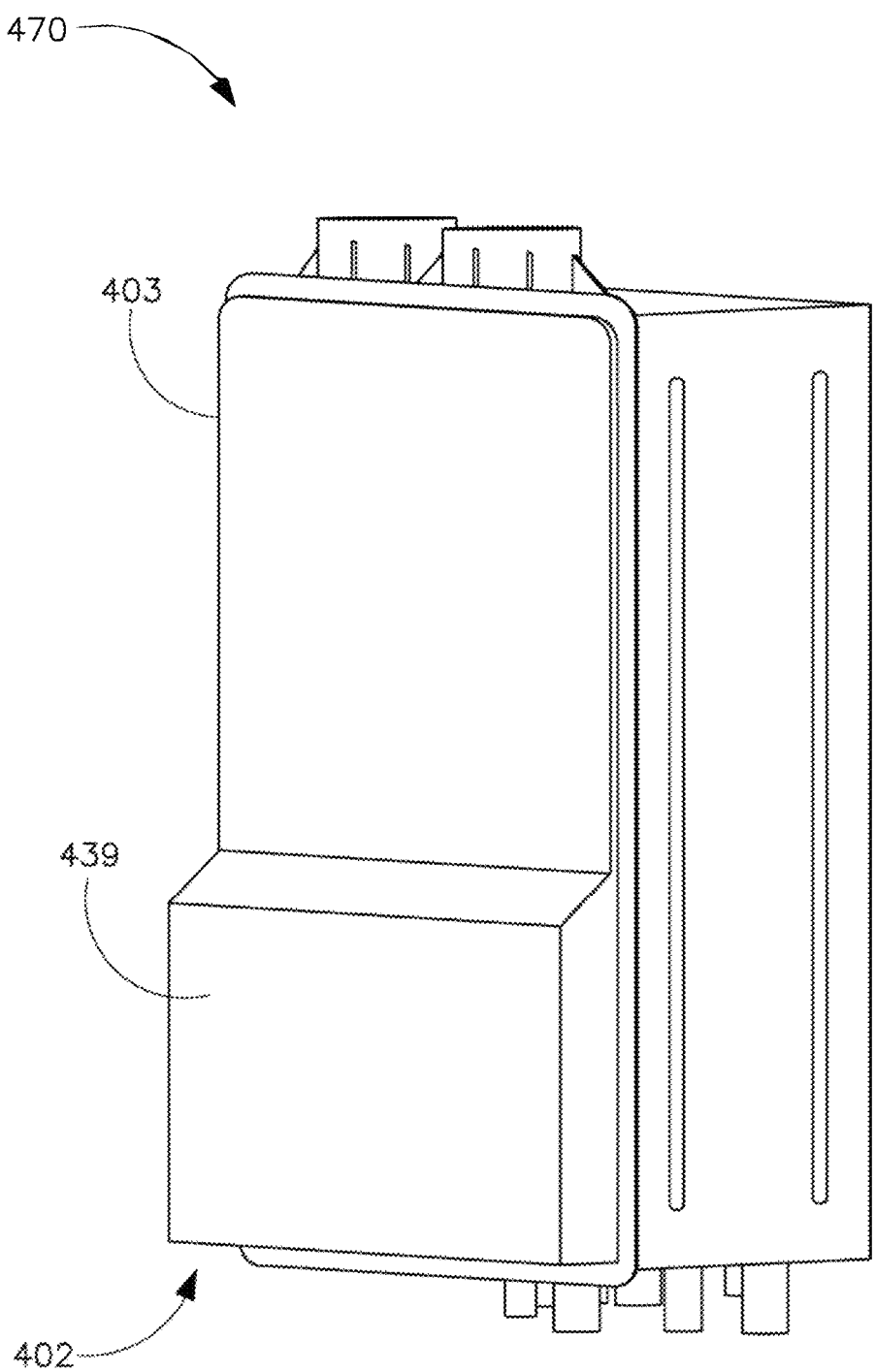
FIG. 4 shows an appliance in the form of a tankless water heater in accordance with certain example embodiments.

When the UPS 102 includes a housing 139, in some cases the housing 139 of the UPS 102 can be coupled to and decoupled from the housing 103 of the appliance 170-1. An example of this is shown in FIG. 4 below. In such a case, the housing 139 of the UPS 102 can have one or more of a number of coupling features (e.g., slots, fastening devices, clips, magnetic attachments, electrical connectors, apertures, interlocking features (e.g., protrusions, recesses)) that complement and couple to corresponding coupling features disposed on the housing 103 of the appliance 170-1. In this way, an example UPS 102 can be integrated with the appliance 170-1 after-market rather than merely as part of a newly manufactured version of the appliance 170-1. In some cases, the appliance 170-1 may require a modification (e.g., change a panel) to allow for the internal or external coupling of the UPS 102.

The power supply 138 of the UPS 102 can be substantially similar to the power supply 140 described above with respect to the appliance 170-1. In this particular case, the power supply 138 converts power provided by the power source 145 and/or the power supply 140 into a type (e.g., alternating current, direct current) and amount (e.g., 24V, 12V, 120V) that are used by the energy storage devices 136 for charging. Similarly, when the energy storage devices 136 discharge reserve power during an outage, the power supply 138 can convert the power released by the energy storage devices 136 into reserve power of a type and amount that is used by the appliance system 135.

The energy storage device 136 can be one or more of any number of rechargeable devices (e.g., batteries, supercapacitors) that are configured to charge using the power provided by the power source 145 and/or the power supply 140. In some cases, the energy storage device 136 charges using a different level and/or type of power relative to the level and type of power that it receives. In such a case, the energy storage device 136 can include any type of power transfer device (e.g., transformer, inverter, converter). There can be any number (e.g., one, two, five) of energy storage devices 136. The energy storage devices 136 can use one or more of any number of battery technologies. Examples of such battery technologies can include, but are not limited to, nickel-cadmium, nickel-metal hydride, lithium-ion, and alkaline. Aside from a battery, an energy storage device 136 can take on any of a number of other forms known in the art. For example, an energy storage device 136 can include one or more supercapacitors.

In some cases, the energy storage device 136 is disposed within one or more optional energy storage device receivers 137. An energy storage device receiver 137 can provide mechanical and/or electrical coupling of the energy storage device 136 to the power source 145, the power supply 140, and/or the switch 152. An energy storage device receiver 137 can provide for permanent mechanical and/or electrical connection with the energy storage device 136. Alternatively, an energy storage device receiver 137 can provide for removable mechanical and/or electrical connection with the energy storage device 136, allowing a user 150 to remove and/or replace the energy storage device 136. In this way, the energy storage device 136 can be removable from an appliance 170-1 or integrated with an appliance 170-1.

In some cases, the energy storage device receiver 137 can be configurable and/or otherwise allow for receiving energy storage devices 136 having different characteristics (e.g., physical size, battery technology, input voltage, output voltage). In such a case, the energy storage device receiver 137 can include any components and/or devices (e.g., switches, adjustable length, adjustable width, sensors) necessary to accommodate, either automatically or by manual adjustment by a user 150, an energy storage device 136 having any of a number of characteristics. In some cases, as in FIGS. 5 through 6D below, an energy storage device receiver 137 is also removable from the UPS 102.

Each optional access port 157 is a physical connection port to which a user system 155 (e.g., cell phone, computer) and/or an appliance 170 (e.g., a radio, a wireless router) can be mechanically and electrically coupled. An access port 157 can be disposed on the housing 139 of the UPS 102, on the housing 103 of the appliance 170-1, or in some other location. An access port 157 can have a standard configuration (e.g., a USB port, a three-prong electrical outlet) or a configuration that is unique to a particular user system 155 and/or appliance 170. An access port 157 can serve any of a number of functions. For example, during an outage, an access port 157 can provide power to charge an energy storage device of a user system 155. In some cases, an access port 157 can also serve such functions during normal operating conditions (not during an outage), in which case power can be provided to the access port 157 by the UPS 102, the power source 145, or the power supply 140.

The user 150, the power supply 140, the power source 135, the network manager 180, the other appliances 170-N, and/or the appliance 170-1 (including the sensors 151 and a local controller, if any) can interact with the controller 104 of the UPS 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the power supply 140, the power source 135, the network manager 180, the other appliances 170-N, and/or some other component of the appliance 170-1. The user 150, the power supply 140, the power source 135, the network manager 180, the other appliances 170-N, and/or some other component of the appliance 170-1 (including portions thereof) can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof. For example, referring to FIG. 2 below, the controller 104 can include a user interface having one or more of a number of I/O devices 216 (e.g., buzzer, alarm, indicating light, pushbutton).

The controller 104, the user 150, the power supply 140, the power source 135, the network manager 180, the other appliances 170-N, and/or the rest of the appliance 170-1 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system 218 as described below with regard to FIG. 2.

Further, as discussed above, such a system can have corresponding software (e.g., user software, sensor device software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The controller 104 can be a stand-alone device or integrated with another component (e.g., the appliance 170-1) in the system 100. When the controller 104 is a stand-alone device, the controller 104 can include a housing. In such a case, the housing can include at least one wall that forms a cavity. In some cases, the housing can be designed to comply with any applicable standards so that the controller 104 can be located in a particular environment (e.g., a hazardous environment, a high temperature environment, a high humidity environment).

The housing of the controller 104 can be used to house one or more components of the controller 104. For example, the controller 104 (which in this case includes the control engine 106, the communication module 108, the timer 110, the optional energy metering module 111, the power module 112, the storage repository 130, the hardware processor 120, the memory 122, the transceiver 124, the application interface 126, and the optional security module 128) can be disposed in a cavity formed by a housing. In alternative embodiments, any one or more of these or other components of the controller 104 can be disposed on a housing and/or remotely from a housing.

The storage repository 130 can be a persistent storage device (or set of devices) that stores software and data used to assist the controller 104 in communicating with the user 150, the power source 135, the network manager 180, the other appliances 170-N, and/or the appliance 170-1 (including other components thereof) within the heating system 100. In one or more example embodiments, the storage repository 130 stores one or more protocols 132, one or more algorithms 133, and stored data 134. The protocols 132 can be any procedures (e.g., a series of method or logic steps) and/or other similar operational procedures that the control engine 106 of the controller 104 follows based on certain conditions at a point in time. The protocols 132 can include any of a number of communication protocols that are used to send and/or receive data between the controller 104 and the user 150, the power source 135, the network manager 180, the other appliances 170-N, and/or some other component of the appliance 170-1.

A protocol 132 can be used for wired and/or wireless communication. Examples of a protocol 132 can include, but are not limited to, Econet, Modbus, profibus, Ethernet, and fiberoptic. One or more of the communication protocols can be a time-synchronized protocol. Examples of such time-synchronized protocols can include, but are not limited to, a highway addressable remote transducer (HART) protocol, a wireless HART protocol, and an International Society of Automation (ISA) 100 protocol. In this way, one or more of the communication protocols can provide a layer of security to the data transferred within the system 100.

The algorithms 133 can be any formulas, mathematical models (e.g., load forecasting models, energy consumption model, energy pricing model), and/or other suitable means of manipulating and/or processing data. One or more algorithms 133 can be used for a particular protocol 132. In some cases, the controller 104 uses information (e.g., current or voltage measurements, temperature measurements, flow rate measurements) provided by the sensor devices 151 and/or the energy metering module 111 to generate, using one or more protocols 132 and/or one or more algorithms 133, information related to the UPS 102.

For example, a protocol 132 and/or an algorithm 133 can dictate when the controller 104 implements an energy conservation mode for some or all of the UPS 102 during an outage. For example, certain parts (e.g., the inverter) of the power supply 138 of the UPS 102 consume a relatively large amount of energy, even when not performing an inversion function. The controller 104 can use one or more protocols 132 and/or one or more algorithms 133 to determine times when reserve power is not actively being provided by the UPS 102 during an outage and put such components in standby mode or turn off such components during those times.

This will prolong the amount of time that the UPS 102 can provide power during an outage, thereby being able to function during an extended outage. In such a case, the controller 104 can create and/or modify (e.g., based on pattern recognition, based on historical usage information saved as stored data 134) one or more protocols 132 and/or one or more algorithms 133 to further optimize energy conservation of the UPS 102.

The one or more protocols 132 and/or one or more algorithms 133 used by the controller 104 for energy conservation can also involve the timer 110, the energy metering module 111, and/or one or more of the sensors 151. For example, a sensor 151 can measure flow rate or temperature for an appliance 170-1 that is a tankless water heater measure. In such a case, the controller 104 can determine, using one or more protocols 132 and/or one or more algorithms 133, whether a measured value has exceeded or fallen blow a threshold value or range of normal values (types of stored data 134).

As another example, if the controller 104 determines (e.g., based on a reading of a sensor 151) that the appliance 170-1 is operating, a protocol 132 can be followed in which the UPS 102 (or components thereof) operates for a fixed period of time. As yet another example, the controller 104 can use one or more protocols 132 and/or one or more algorithms 133 to determine, based on power measurements made by the energy metering module 111, whether the appliance 170-1 and/or one or more other appliances 170-N are operating or in standby mode. If one or more appliances 170 are in standby mode, then the controller 104 can control the activity of the other components of the UPS 102 using one or more protocols 132 and/or one or more algorithms 133 in conjunction with the power measurements made by the energy metering module 111.

Similarly, if some or all of the UPS 102 is in an energy conservation mode during an outage, the controller 104, following one or more protocols 132 and/or one or more algorithms 133, can determine when one or more appliances 170 suddenly needs the UPS 102 to operate. These one or more protocols 132 and/or one or more algorithms 133 can be followed by the controller 104 in conjunction with the timer 110, the energy metering module 111, and/or one or more of the sensors 151, in a manner similar to how the controller 104 recognizes the ability to enter standby mode for some or all of the UPS 102.

In some cases, the controller 104, using one or more protocols 132 and/or one or more algorithms 133, and in conjunction with the energy metering module 111, can actively adjust the power factor of the UPS 102 in real time based on current loading conditions. By actively adjusting the power factor of the UPS 102 in real time, the controller 104 can further optimize the performance and energy efficiency of the UPS 102, thereby extending the ability of the UPS 102 to provide reserve power in an extended outage while also extending the useful life of the UPS 102 and the one or more appliances 170 to which the UPS 102 provides reserve power. If the UPS 102 also has one or more access ports 157 that are engaged during an outage, this real-time power factor control by the controller 104 can also extend the useful life of the devices (e.g., user system 155) plugged into each access port 157.

In certain example embodiments, an appliance 170 (e.g., appliance 170-1) has an appliance system 135 that requires a relatively large start-up current in order to operate. In such a case, the controller 104, using one or more protocols 132 and/or one or more algorithms 133, and in conjunction with the energy metering module 111 and/or one or more sensors 151, can actively and in real time determine whether the UPS 102 needs to provide a temporary boost of energy to meet the momentary start-up demand of the appliance system 135. The controller 104 can also similarly anticipate periods of high demand (e.g., multiple appliances 170 operating simultaneously during an outage) and boost the output of the UPS 102 by an appropriate amount and for an appropriate period of time to meet such high demand.

In some cases, the controller 104, using one or more protocols 132 and/or one or more algorithms 133, and in conjunction with the energy metering module 111 and/or one or more sensors 151, can factor the cost of market power into whether reserve power should be provided instead. In other words, the controller 104 can cause the UPS 102 to provide reserve power during times when the power source 145 and the power supply 140 are available but not used (a type of voluntary outage), based solely on economic conditions. If the cost of power from the power source 145 is fixed at certain times of the day or day of the week, then this information can be stored data.

If the cost of power from the power source 145 is variable based on current market conditions, then the controller 104 can have access to this information, using the communication module 108 and transceiver 124, to determine and evaluate the market prices. If the controller 104 determines that the economics warrant using reserve power from the UPS 102 rather than power from the power source 145 and the power supply 140, then the controller 104 can cause the switch 152 to operate, essentially creating a voluntary or forced outage condition with respect to the power source 145 and the power supply 140.

In some cases, as when the appliance 170-1 is a water heater, the controller 104 of the UPS 102, using one or more protocols 132 and/or one or more algorithms 133, and in conjunction with the energy metering module 111 and/or one or more sensors 151 (e.g., a temperature sensor, a moisture sensor), can initiate a fail-safe protection scheme. Specifically, the controller 104 can cause a purge of water from pipes in and connected to the water heater in cold weather during involuntary (unexpected) outages of the power source 145 and the power supply 140. This operation can be performed by the controller 104 during an extended outage where the reserve power that can be provided by the UPS 102 is nearing the point of running out. This purging operation can prevent water left in the pipes from freezing, thereby potentially causing the pipes to crack or otherwise become compromised.

Stored data 134 can be any data associated with the system 100 (including any components thereof), any measurements taken by the sensor devices 151, time measured by the timer 110, adjustments to an algorithm 133, threshold values, user preferences, default values, results of previously run or calculated algorithms 133, and/or any other suitable data. Such data can be any type of data, including but not limited to historical data for the system 100 (including any components thereof, such as the UPS 102, the appliance system 135, and the sensor devices 151), calculations, adjustments made to calculations based on actual data, and measurements taken by one or more sensor devices 151. Stored data 134 can be historical data, present data, or future data (e.g., forecasts). The stored data 134 can be associated with some measurement of time derived, for example, from the timer 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the power source 135, the network manager 180, the other appliances 170-N, and/or some other component of the appliance 170-1 (including portions thereof) in the system 100. More specifically, the control engine 106 sends information to and/or receives information from the storage repository 130 in order to communicate with the user 150, the power source 135, the network manager 180, the other appliances 170-N, and/or some other component of the appliance 170-1. As discussed below, the storage repository 130 can also be operatively connected to the communication module 108 in certain example embodiments.

In certain example embodiments, the control engine 106 of the controller 104 controls the operation of one or more components (e.g., the communication module 108, the timer 110, the transceiver 124) of the controller 104. For example, in addition to the examples provided above with respect to the algorithms 133 and protocols 132, the control engine 106 can activate the communication module 108 when the communication module 108 is in "sleep" mode and when the communication module 108 is needed to send data received from another component (e.g., switch 156, a sensor 151, the user 150) in the system 100.

As another example, the control engine 106 can acquire the current time using the timer 110. The timer 110 can enable the controller 104 to control the other components of the appliance 170-1 and/or another appliance 170-N. As yet another example, the control engine 106 can direct a sensor 151 to measure a parameter (e.g., temperature, flow rate) and send the measurement by reply to the control engine 106. In certain example embodiments, the controller 104 can communicate with (e.g., provide input to, receive input from) and, in some cases, control and/or provide power to a controller of another appliance 170-N in the system 100.

The control engine 106 can be configured to perform a number of functions that help the controller 104 make a determination (an estimate) that relates to the appliance 170-1 at a particular point in time. For example, the control engine 106 can execute any of the protocols 132 and/or algorithms 133 stored in the storage repository 130 and use the results of those protocols 132 and/or algorithms 133 control the appliance 170-N and to communicate to a user 150 the status and/or operation of the appliance 170-1. As another example, the control engine 106 of the controller 104 can determine when an outage (whether voluntary or involuntary) has occurred or should occur, based on measurements made by the energy metering module 111, measurements made by one or more sensors 151, the result of an algorithm 133 and/or protocol 132, or some other factor. Alternatively, the controller 104 can receive instructions from another component (e.g., the appliance system 135) that an outage has occurred and follow appropriate protocols 132 based on that communication.

The control engine 106 can generate an alarm or some other form of communication when an operating parameter (e.g., amount of reserve power remaining in the UPS 102, temperature read by a temperature sensor 158) exceeds or falls below a threshold value (in other words, falls outside an acceptable range of values). The control engine 106 can also track measurements made by a sensor device 151 and determine a possible present or future failure some other component of the appliance 170-1 or, more generally, the system 100. The control engine 106 can perform its evaluation functions and resulting actions on a continuous basis, periodically, during certain time intervals, or randomly. Further, the control engine 106 can perform its evaluation and operating functions for the present time or for a period of time in the future.

The control engine 106 can provide power, control, communication, and/or other similar signals to the user 150, the power source 135, the network manager 180, the other appliances 170-N, and/or some other component of the appliance 170-1 (including portions thereof). Similarly, the control engine 106 can receive power, control, communication, and/or other similar signals from the user 150, the power source 135, the network manager 180, the other appliances 170-N, and/or some other component of the appliance 170-1. The control engine 106 can control each sensor 151 and/or other component in the system 100 automatically (for example, based on one or more algorithms 133 stored in the storage repository 130) and/or based on power, control, communication, and/or other similar signals received from another device through a signal transfer link 105 and/or a power transfer link 185. The control engine 106 may include a printed circuit board, upon which the hardware processor 120 and/or one or more discrete components of the controller 104 are positioned.

In certain embodiments, the control engine 106 of the controller 104 can communicate with one or more components (e.g., a network manager) of a system external to the system 100. For example, the control engine 106 can interact with an inventory management system by ordering a component (e.g., a sensor device 151) to replace a sensor device 151 that the control engine 106 has determined has failed or is failing. As another example, the control engine 106 can interact with a workforce scheduling system by scheduling a maintenance crew to repair or replace an appliance 170 (or component thereof) of the system 100 when the control engine 106 determines that the appliance 170 requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., a user 150, a switch 152) of the system 100. For example, if a user 150 operates under IEC Standard 62386, then the user 150 can have a serial communication interface that will transfer data (e.g., stored data 134) measured by the sensors 151. In such a case, the control engine 106 can also include a serial interface to enable communication with the user 150. Such an interface can operate in conjunction with, or independently of, the protocols 132 used to communicate between the controller 104 and the user 150, the power source 135, the network manager 180, the other appliances 170-N, and/or some other component of the appliance 170-1 (or portion thereof).

The control engine 106 (or other components of the controller 104) can also include one or more hardware components (e.g., peripherals) and/or software elements to perform its functions. Such components can include, but are not limited to, a universal asynchronous receiver/transmitter (UART), a serial peripheral interface (SPI), an analog-to-digital converter, an inter-integrated circuit ($I^2C$), and a pulse width modulator (PWM).

The communication module 108 of the controller 104 implements the communication protocol (e.g., from the protocols 132 of the storage repository 130) that is used when the control engine 106 communicates with (e.g., sends signals to, receives signals from) the user 150, the power source 135, the network manager 180, the other appliances 170-N, and/or some other component of the appliance 170-1 (or portion thereof). In some cases, the communication module 108 accesses the stored data 134 to determine which communication protocol is used to communicate with a sensor 151 associated with certain stored data 134. In addition, the communication module 108 can interpret the communication protocol of a communication received by the controller 104 so that the control engine 106 can interpret the communication.

The communication module 108 can send and receive data between the power source 135, the network manager 180, the other appliances 170-N, some other component of the appliance 170-1 (or portion thereof), and/or the users 150 and the controller 104. The communication module 108 can send and/or receive data in a given format that follows a particular protocol 132. The control engine 106 can interpret the data packet received from the communication module 108 using the protocol 132 information stored in the storage repository 130. The communication module 108 can also facilitate the data transfer between the control engine 106, the power source 135, the network manager 180, the other appliances 170-N, some other component of the appliance 170-1, and a user 150 by converting the data into a format understood by the recipient of the data.

The communication module 108 can send data (e.g., protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can track time periods based on an instruction received from the control engine 106, based on an instruction received from the user 150, based on an instruction programmed in the software for the controller 104, based on some other condition or from some other component, or from any combination thereof.

The timer 110 can be configured to track time when there is no power delivered to the controller 104 (e.g., the power module 112 malfunctions) using, for example, a super capacitor or a battery backup. In such a case, when there is a resumption of power delivery to the controller 104, the timer 110 can communicate any aspect of time to the controller 104. In such a case, the timer 110 can include one or more of a number of components (e.g., a super capacitor, an integrated circuit) to perform these functions.

The power module 112 of the controller 104 provides power to one or more other components (e.g., timer 110, control engine 106) of the controller 104. In addition, in certain example embodiments, the power module 112 can provide power to one or more components (e.g., the appliance system 135, a sensor 151, a switch 152) of the appliance 170-1. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown and separate from the power metering module 111) to measure one or more elements of power that flows into, out of, and/or within the controller 104.

The power module 112 can include one or more components (e.g., a transformer, a diode bridge, an inverter, a converter) that receive power (for example, through an electrical cable) from the power supply 140, the power source 145, and/or an energy storage device 136, and generates power of a type (e.g., AC, DC) and level (e.g., 12V, 24V, 120V) that can be used by the other components of the controller 104 and/or by other components the appliance 170-1. In some cases, the power module 112 can use a closed control loop to maintain a preconfigured voltage or current with a tight tolerance at the output. The power module 112 can also protect the remainder of the electronics (e.g., hardware processor 120, transceiver 124) in the controller 104 from surges generated in the line.

In addition, or in the alternative, the power module 112 can be a source of power in itself to provide signals to the other components of the controller 104. For example, the power module 112 can be a battery (e.g., can be part of an energy storage device 136). As another example, the power module 112 can be a localized photovoltaic power system.

In certain example embodiments, the power module 112 of the controller 104 can also provide power and/or control signals, directly or indirectly, to one or more of the sensor devices 151. In such a case, the control engine 106 can direct the power generated by the power module 112 to one or more of the sensor devices 151. In this way, power can be conserved by sending power to the sensor devices 151 when those devices need power, as determined by the control engine 106.

The energy metering module 111 of the controller 104 can measure one or more components of power (e.g., current, voltage, resistance, VARs, watts) at one or more points (e.g., output of the power supply 140) associated with the appliance 170-1. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor.

The hardware processor 120 of the controller 104 executes software, algorithms 133, and firmware in accordance with one or more example embodiments. Specifically, the hardware processor 120 can execute software on the control engine 106 or any other portion of the controller 104, as well as software used by the user 150, the power source 135, the network manager 180, the other appliances 170-N, and/or some other component of the appliance 170-1 (or portions thereof). The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the power source 135, the network manager 180, the other appliances 170-N, and/or some other component of the appliance 170-1 (or portions thereof). The transceiver 124 can use wired and/or wireless technology. The transceiver 124 can be configured in such a way that the control and/or communication signals sent and/or received by the transceiver 124 can be received and/or sent by another transceiver that is part of the user 150, the power source 135, the network manager 180, the other appliances 170-N, and/or some other component of the appliance 170-1 (or portions thereof). The transceiver 124 can use any of a number of signal types, including but not limited to radio frequency signals.

When the transceiver 124 uses wireless technology, any type of wireless technology can be used by the transceiver 124 in sending and receiving signals. Such wireless technology can include, but is not limited to, Wi-Fi, visible light communication, Zigbee, mobile apps, text/email messages, cellular networking, Bluetooth Low Energy, and Bluetooth. The transceiver 124 can use one or more of any number of suitable communication protocols (e.g., ISA100, HART) when sending and/or receiving signals. Such communication protocols can be stored in the protocols 132 of the storage repository 130. Further, any transceiver information for the user 150, the power source 135, the network manager 180, the other appliances 170-N, and/or some other component of the appliance 170-1 (or portions thereof) can be part of the stored data 134 (or similar areas) of the storage repository 130.

Optionally, in one or more example embodiments, the security module 128 secures interactions between the controller 104, the user 150, the power source 135, the network manager 180, the other appliances 170-N, and/or some other component of the appliance 170-1 (or portions thereof). More specifically, the security module 128 authenticates communication from software based on security keys verifying the identity of the source of the communication. For example, user software may be associated with a security key enabling the software of the user 150 to interact with the controller 104 and/or the sensors 151. Further, the security module 128 can restrict receipt of information, requests for information, and/or access to information in some example embodiments.

Figure 2:
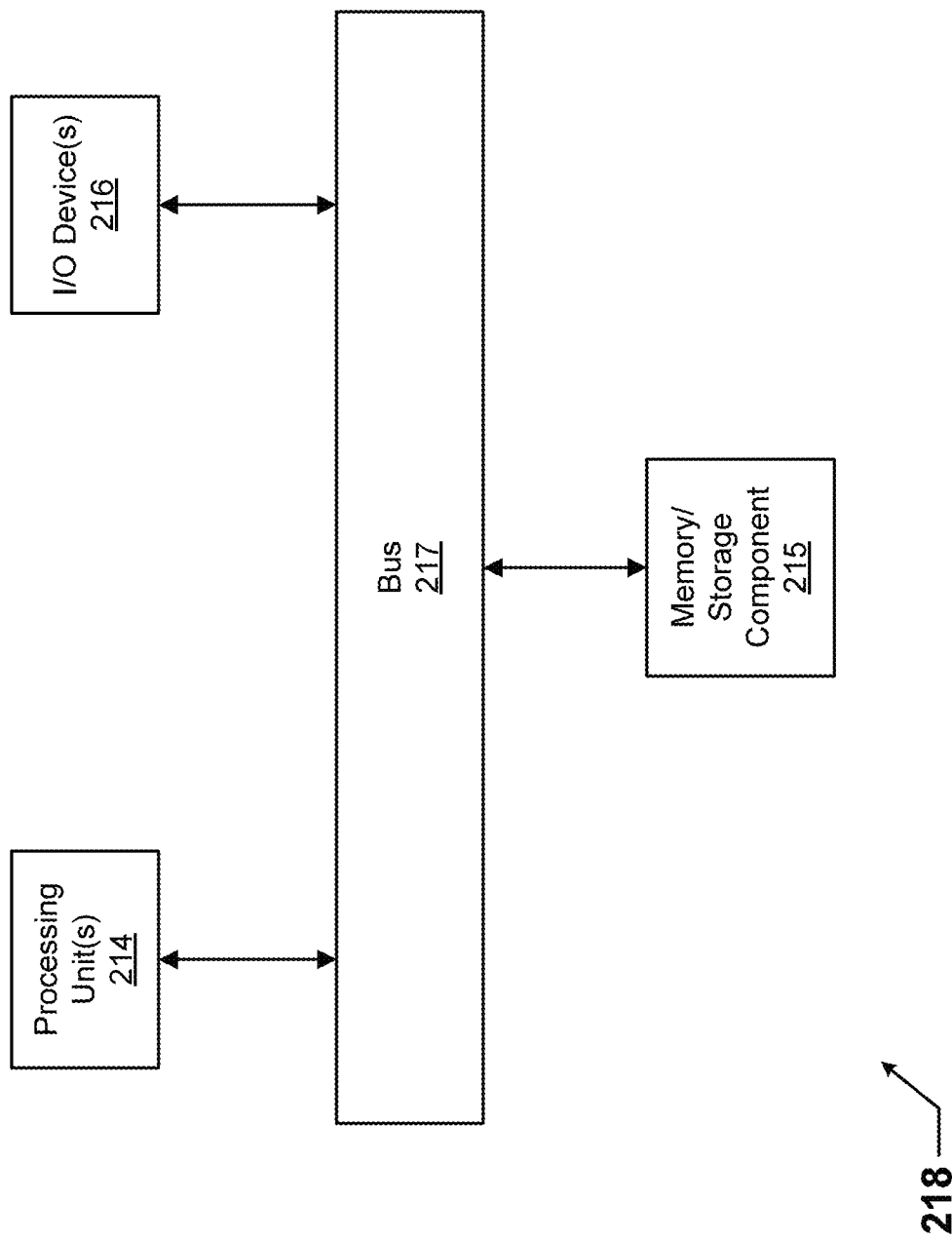
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain example embodiments. For example, computing device 218 can be implemented in the UPS 102 of FIGS. 1A and 1B in the form of the hardware processor 120, the memory 122, and the storage repository 130, among other components. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, or any other medium which is used to store the desired information and which is accessible by a computer.

The computer device 218 is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer system 218 includes at least the minimal processing, input, and/or output means necessary to practice one or more embodiments.

Further, those skilled in the art will appreciate that one or more elements of the aforementioned computer device 218 can be located at a remote location and connected to the other elements over a network in certain example embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 3:
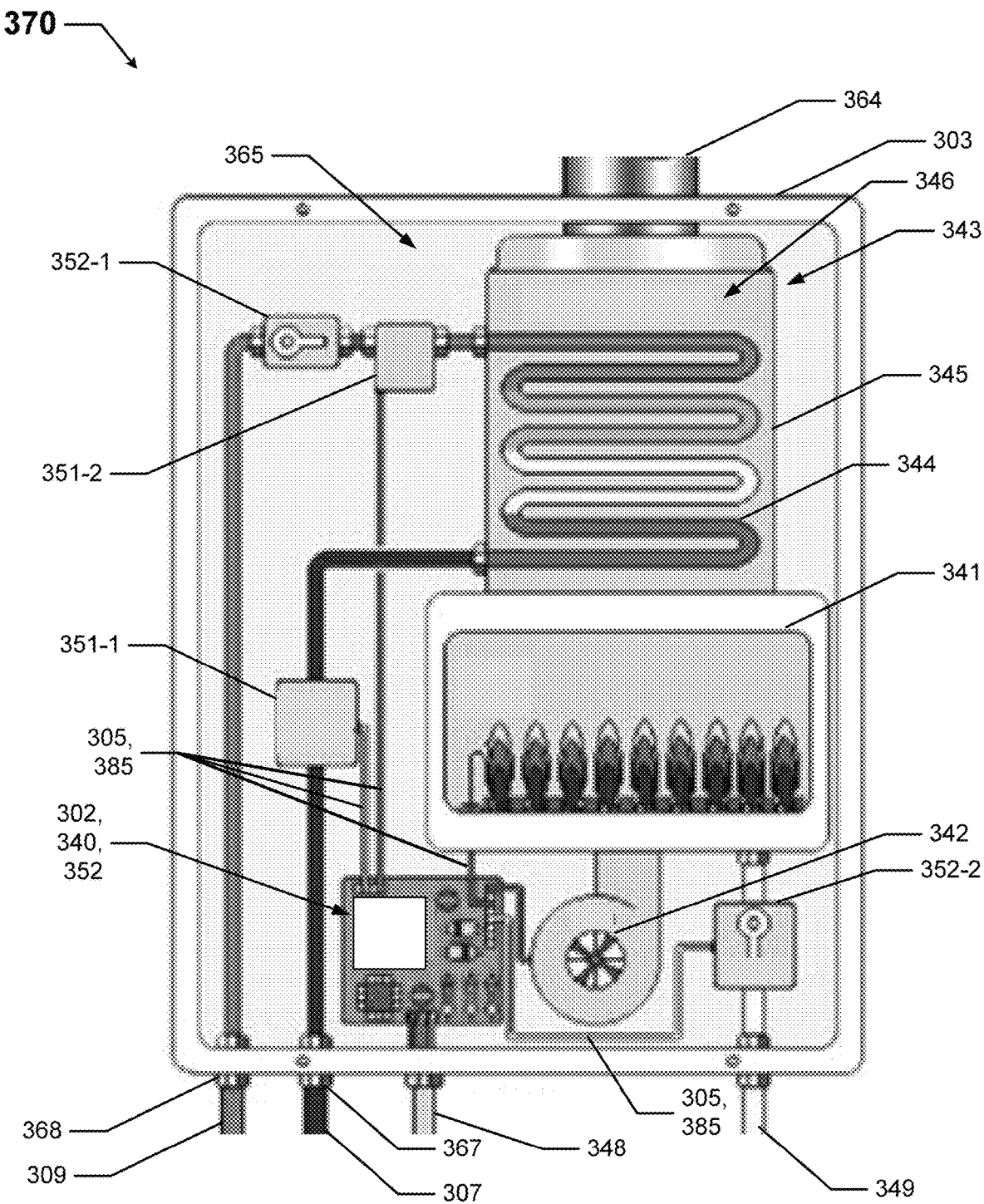
FIG. 3 shows a diagram of a tankless water heater in accordance with certain example embodiments.

FIG. 3 shows a diagram of an appliance 370 in the form of a tankless water heater in accordance with certain example embodiments. Referring to FIGS. 1A through 3, the tankless water heater 370 of FIG. 3 can have a number of features and/or components that are substantially similar to the appliance 170-1 of FIGS. 1A and 1B. For example, the tankless water heater 370 of FIG. 3 can include a UPS 302 (including a controller), a flow sensor 351-1, a temperature sensor 351-2, multiple signal transfer links 305, and multiple power transfer links 385, which can be substantially similar to the corresponding components of the appliance 170-1 of FIGS. 1A and 1B. Some of the signal transfer links 305 and the power transfer links 385 are delivered to the water heater 370 by a conduit 348, and a fuel (e.g., natural gas, propane) is delivered to the ignitor 341 through the valve 352-2 using a pipe 349.

The tankless water heater 370 of FIG. 3 also includes a number of other components (generally considered part of the appliance system, such as appliance system 135 of FIG. 1A). In this example, some of those other components include an inlet tube 307, an outlet tube 309, an inlet fitting 367, an outlet fitting 368, and multiple valves 352 (in this case, valve 352-1 and valve 352-2). Also included in the tankless water heater 370 of FIG. 3 are an ignitor 341 (also sometimes called a burner 341), an air moving device 342, a heat exchanger 343, and a vent 364. One or more of the components of the tankless water heater 370 can be controlled by the controller of the UPS 302 during any type of outage (e.g., voluntary, involuntary) condition. The ignitor 341 of the tankless water heater 370 can be a flame or other source of heat that is ignited or otherwise initiated when a demand for heated water (as determined by the control module of the UPS 302 during an outage) is detected.

The air moving device 342 can be used to direct the heat generated by the ignitor 341 toward the heat exchanger 343. The air moving device 342 can be a fan, a blower, and/or any other device that can force the heat generated by the ignitor 341 toward the heat exchanger 343. Specifically, in this case, the air moving device 342 forces the heat generated by the ignitor 341 into the cavity 346 of the heat exchanger 343. The air moving device 342 can have one or more discrete speeds, or can have variable speeds. The air moving device 342 can operate when the ignitor operates. The air moving device 342 can be controlled automatically or by the controller of the UPS 302 during an outage.

The heat exchanger 343 can include one or more coils 344 that form a shape (e.g., serpentine, helical) throughout some or all of a cavity 346 formed by one or more walls 345 of the heat exchanger 343. Regardless of the configuration, the coil 344 is designed to have a large surface area that is exposed to the heat generated by the ignitor 341 as the heat passes over the coil 344. The coil 344 can be made of a thermally conductive material (e.g., aluminum, copper) so that the heat can be absorbed by the coil 344. The heat exchanger 343 can also include a vent 364 that extends through the top of the heat exchanger 343 and the top wall 366 of the water heater 360. The vent 364 allows exhaust from the ignitor 341 to be safely disbursed into the ambient environment. The heat exchanger 343, as well as the other components of the tankless water heater 370, can be disposed within a cavity 365 formed by the housing 303 (made of one or more walls) of the tankless water heater 370.

The coil 344 is filled with water that is circulated therethrough. One end of the coil 344 is coupled to the inlet tube 307, thereby receiving unheated water. As the water circulates through the coil 344, it continues to absorb the heat absorbed from the ignitor 341 by the coil 344. The water in the coil 344 can be circulated using a pump, gravity, pressure differentials, and/or any other method for circulating water. When the water reaches the other end of the coil 344 of the heat exchanger 343, the water has absorbed enough heat to become heated water. The other end of the coil 344 of the heat exchanger 343 is coupled to the outlet tube 309, which delivers the heated water to a heated water demand and/or another water heater, as discussed below.

The tankless water heater 370 of FIG. 3 is only one example of how such an appliance can be configured. A number of other components and/or configurations of a tankless water heater 370, whether now known or developed in the future, can be used in example systems. Similarly, the components and/or configurations of the remainder of the tankless water heater 370, whether now known or developed in the future, can be used in example systems.

FIG. 4 shows an appliance 470 in the form of a tankless water heater in accordance with certain example embodiments. Referring to FIGS. 1A through 4, the appliance 470 has a housing 403 that is substantially similar to the housings (e.g., housing 103, housing 303) described above. In this case, the appliance 470 originally did not have a UPS 402, and so the UPS 402 has been integrated to the housing 403 of the appliance 470 as an add-on. In other words, the housing 403 of the appliance 470 has been retrofitted to accommodate the UPS 402. Specifically, as shown in FIG. 4, the housing 439 of the UPS 402 is coupled to the housing 403 of the appliance 470.

This example embodiment shown in FIG. 4 can be performed in one or more of any number of ways. For example, the original front panel of the housing 403 of the appliance 470 can be replaced by a user (e.g., user 150) with a new front panel that can have one or more of a number of electrical and/or mechanical coupling features that complement corresponding electrical and/or mechanical coupling features disposed on the back surface of the enclosure 439 of the UPS 402. In this way, the original appliance 470 can be retrofitted to include an example UPS 402 with minimal effort.

Figure 5:
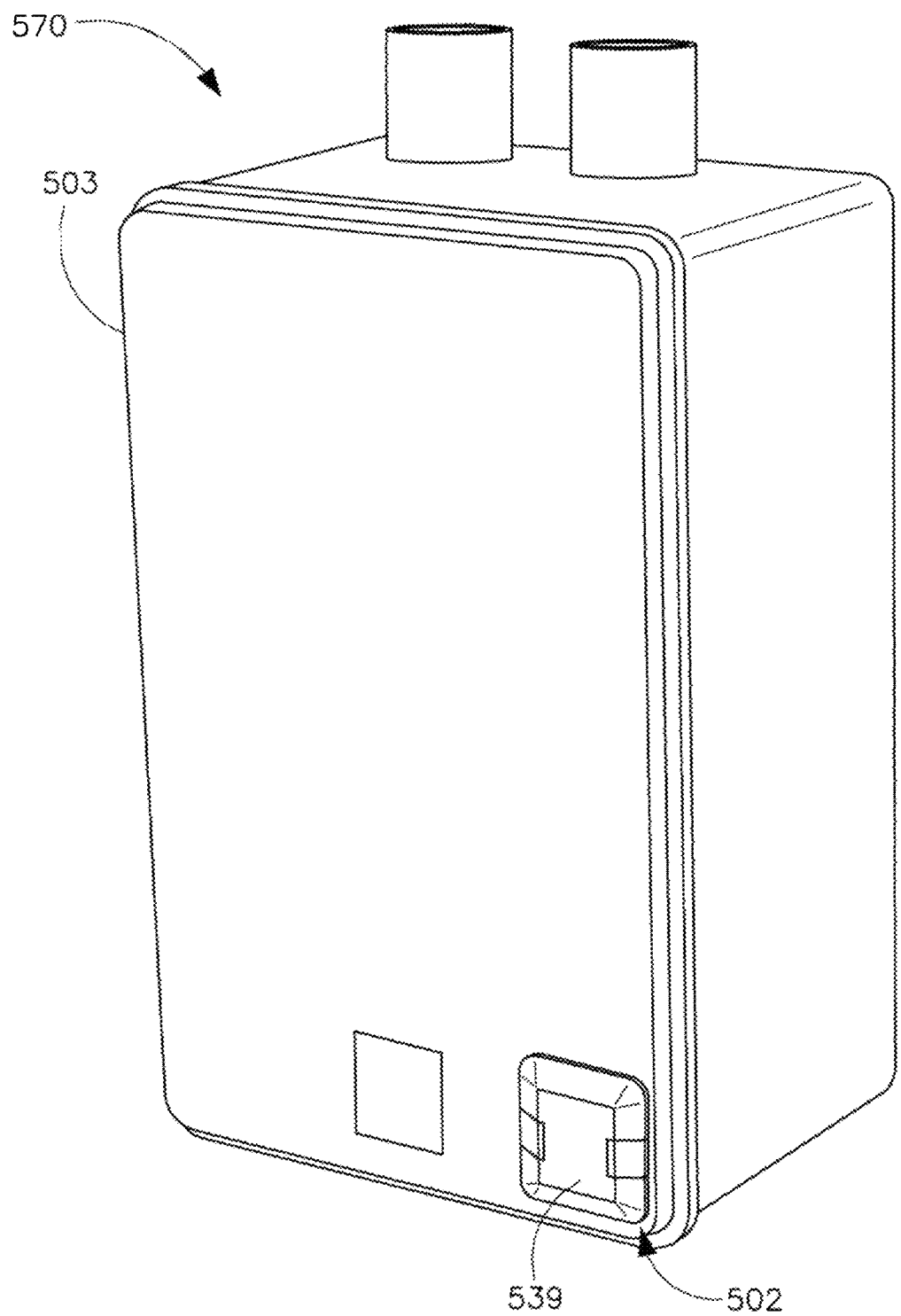
FIG. 5 shows an appliance in the form of another tankless water heater in accordance with certain example embodiments.
Figure 6A:
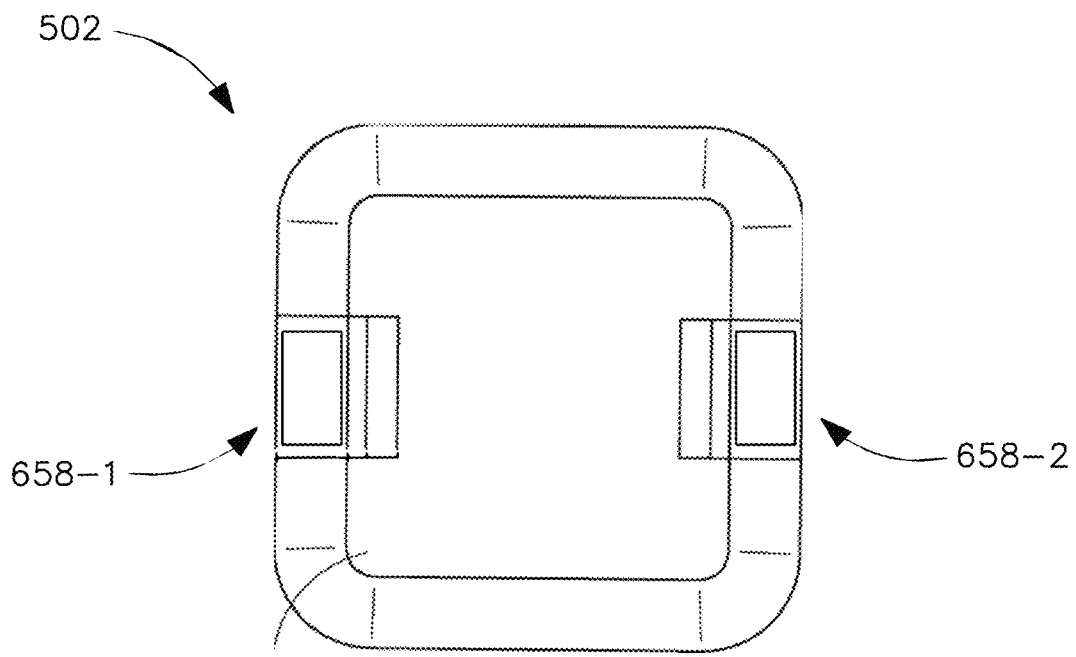
FIGS. 6A-6D show the UPS of FIG. 5 in accordance with certain example embodiments.
Figure 6B:
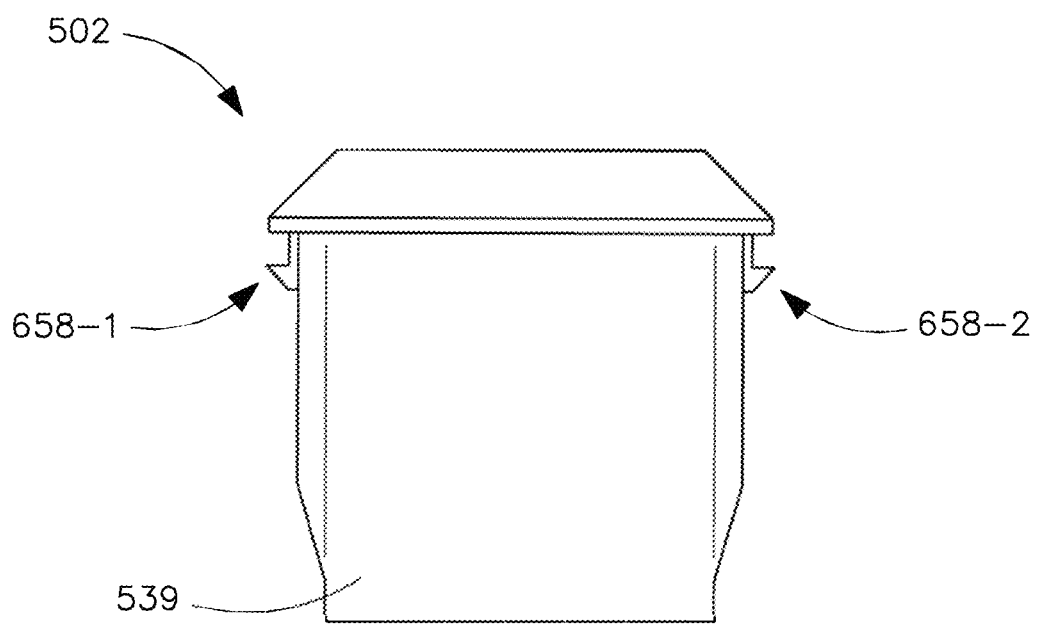
Figure 6C:
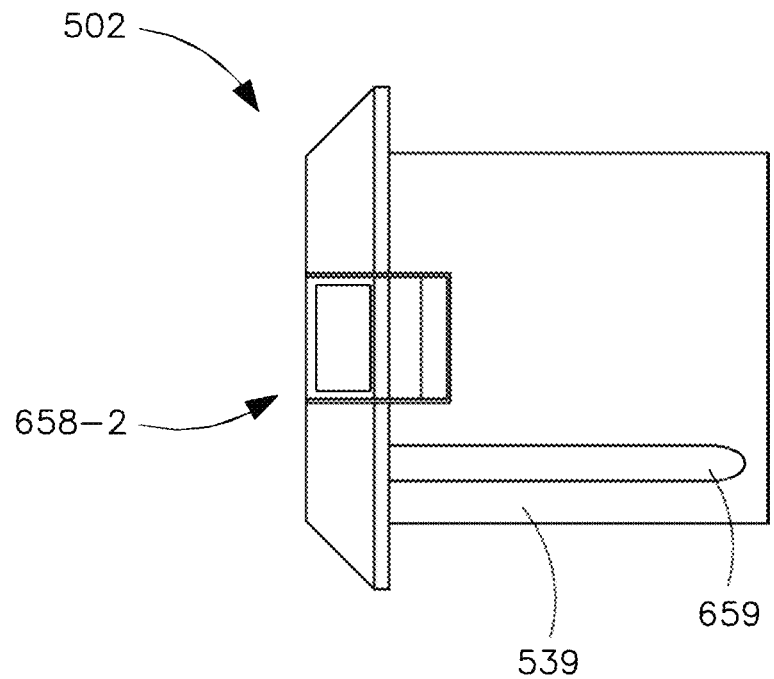
Figure 6D:
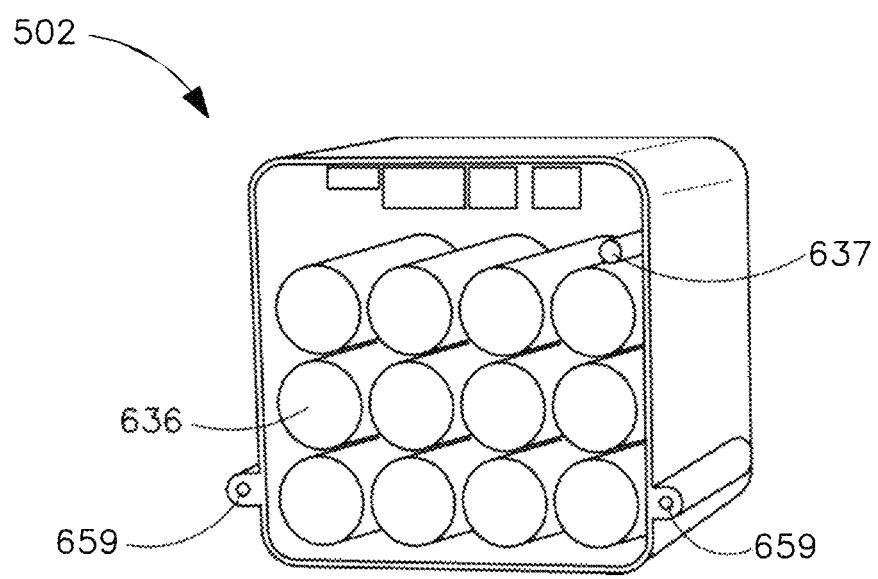

FIG. 5 shows an appliance 570 in the form of another tankless water heater in accordance with certain example embodiments. FIGS. 6A-6D show various view of the UPS 502 of FIG. 5 in accordance with certain example embodiments. Specifically, FIG. 6A shows a front view of the UPS 502. FIG. 6B shows a bottom view of the UPS 502. FIG. 6C shows a side view of the UPS 502. FIG. 6D shows a front-side perspective view of the UPS 502 with the front cover of the housing 539 removed. Referring to FIGS. 1A through 6D, the appliance 570 of FIG. 5 includes a housing 503 that has at least one coupling feature (e.g., an aperture, retaining clips) disposed therein (in this case, on the front panel). These coupling features are hidden from view by the UPS 502.

In some cases, the coupling features disposed on the housing 503 of the appliance 570 can be at some other location (e.g., the bottom, a side, the top) on the housing 503. The housing 503 can be manufactured with such coupling features. Alternatively, as was the case in FIG. 4, the housing 503 can be retrofitted to accommodate the UPS 502 as an added feature.

The UPS 502 of FIGS. 5 through 6D can be the entire UPS 502 or part of the UPS 502. In the latter case, the remainder of the UPS 502 can be disposed within the cavity formed by the housing 503 of the appliance 570. In the former case, components such as the controller (e.g., controller 104) can be disposed within the housing 539 of the UPS 502. In certain example embodiments, part (e.g., the rear wall, the front panel) of the housing 539 of the UPS 502 can be movable or removable to allow access to the 12 energy storage devices 636 (in this case, batteries). The inner surface of the housing 539 of the UPS 502 can include one or more energy storage device receivers 637 (e.g., slots, protrusions, recesses) to receive the energy storage devices 636 in a certain location and orientation.

In addition, the UPS 502 can be physically removed from the housing 503 of the appliance 570. In such a case, the housing 539 of the UPS 502 can include one or more features to allow for the removal and reinsertion of the UPS 502 with respect to the housing 503 of the appliance 570. For example, as shown in FIGS. 5, 6A, and 6C, the front panel of the housing 539 of the UPS 502 can include one or more coupling features 658 that allow the UPS 502 to be coupled to and decoupled from the housing 503 of the appliance 570. In this case, there are two identically-configured coupling features 658, where coupling feature 658-1 and coupling feature 658-2 are disposed on opposite sides of the front panel of the housing 539 of the UPS 502. Each coupling feature 658 includes a depressable tab that couples to (in a default state) and decouples from (when depressed) complementary coupling features disposed on the housing 503 of the appliance 570.

In addition, the outer surface of the two side walls of the housing 539 of the UPS 502 include a protrusion 659 (another type of coupling feature) disposed along most of the length of the side walls toward the bottom of the side walls. These protrusions 659 have a size, shape, and location that allows the protrusions 659 to slide within complementary slots disposed on and/or within the housing 503 of the appliance 570 to allow the UPS 502 to slide in and out relative to the housing 503 of the appliance 570. Such protrusions 659 can also be used to ensure that the UPS 502 is properly oriented when coupled to the rest of the appliance 570. The protrusions 659 of the UPS 502 of FIGS. 6A-6D are only one example of many ways in which coupling features of various configurations can be used to perform such functions as couple the UPS 502 to the housing 503 of the appliance 570, decouple the UPS 502 from the housing 503 of the appliance 570, and properly orient the UPS 502 with respect to the housing 503 of the appliance 570.

Figure 7:
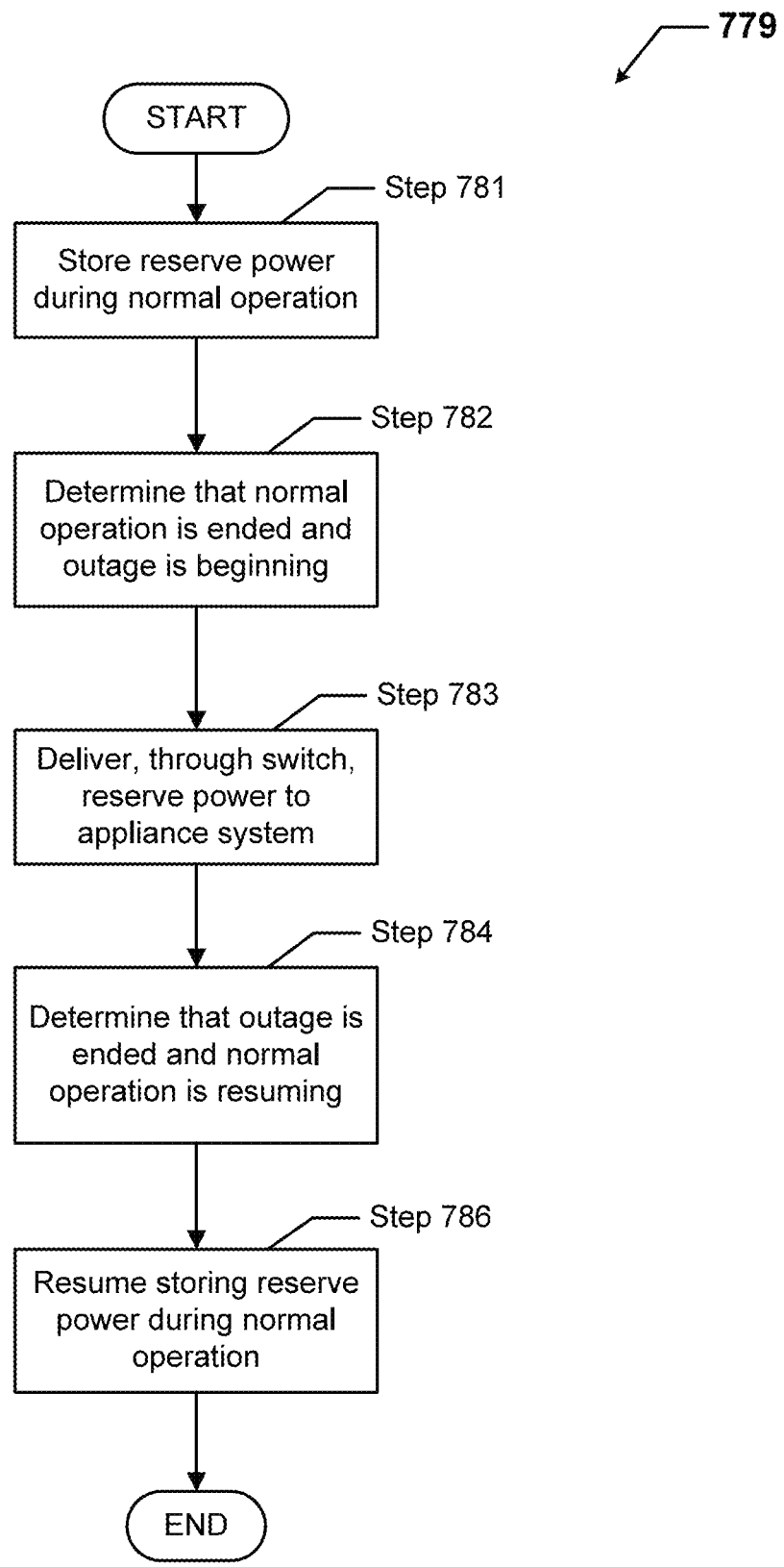
FIG. 7 shows a flowchart for providing reserve power from a UPS to an appliance in accordance with certain example embodiments.

FIG. 7 shows a flowchart for a method 779 for providing reserve power from a UPS to an appliance in accordance with certain example embodiments. While the various steps in this flowchart are presented and described sequentially, one of ordinary skill in the art will appreciate that some or all of the steps can be executed in different orders, combined or omitted, and some or all of the steps can be executed in parallel depending upon the example embodiment. Further, in one or more of the example embodiments, one or more of the steps described below can be omitted, repeated, and/or performed in a different order. For example, the process of optimizing a water heating system can be a continuous process, and so the START and END steps shown in FIG. 7 can merely denote the start and end of a particular series of steps within a continuous process.

In addition, a person of ordinary skill in the art will appreciate that additional steps not shown in FIG. 7 can be included in performing these methods in certain example embodiments. Accordingly, the specific arrangement of steps should not be construed as limiting the scope. In addition, a particular computing device, as described, for example, in FIG. 2 above, can be used to perform one or more of the steps for the methods described below in certain example embodiments. For the methods described below, unless specifically stated otherwise, a description of the controller (e.g., controller 104) performing certain functions can be applied to the control engine (e.g., control engine 106) of the controller.

For clarity, the controller described with respect to these method steps can control other aspects of the UPS (e.g., UPS 102) while performing the functions described above and in the methods of FIG. 7 below. For example, the controller can perform energy management functions (such as those described above) independently of, or in conjunction with, the functions described herein.

Referring to FIGS. 1A-7, the example method 779 of FIG. 7 begins at the START step and proceeds to step 781, where reserve power is stored during normal operations. The reserve power can be stored in one or more energy storage devices 136 using power received from the power source 145 and/or the power supply 140. Control of the amount of power stored, the rate at which power is stored, and any other relevant factors associated with this step 781 can be provided by the controller 104. As discussed above, normal operations can be any time where there is not a voluntary or involuntary outage of the power source 145 and/or the power supply 140.

In step 782, a determination is made that normal operation has ended and an outage is beginning. The outage can be a voluntary outage (e.g., made for economic reasons) or an involuntary outage (e.g., loss of power from the power source 145 and/or the power supply 140). The determination can be made by the controller 104 of the UPS 102. In such a case, the controller 104 can make the determination based on, for example, measurements made by the energy metering module 111, measurements made by one or more sensors 151, the result of an algorithm 133 and/or protocol 132, and/or some other factor. Alternatively, the controller 104 can receive a communication from another component (e.g., a controller of the appliance system 135, operation of the switch 152) that an outage has occurred and follow appropriate protocols 132 based on that communication.

In step 783, reserve power is delivered through the switch 152 to the appliance system 135. Specifically, the controller 104 controls the release of the reserve power from one or more of the energy storage devices 136, which flows toward the switch 152. Since the switch 152 is in a closed position relative to the UPS 102, the reserve power flows through the switch 152 to the appliance system 135. In some cases, the reserve power first flows through the power supply 138 of the UPS 102 so that the reserve power is of a type and level that is sufficient for consumption by the appliance system 135. In some cases, the controller 104 controls the position of the switch 152 so that reserve power can flow therethrough. In other cases, some other component of the appliance 170 controls the position of the switch 152.

In step 784, a determination is made that the outage has ended and normal operation has resumed. The determination can be made by the controller 104 of the UPS 102. In such a case, the controller 104 can make the determination based on, for example, measurements made by the energy metering module 111, measurements made by one or more sensors 151, the result of an algorithm 133 and/or protocol 132, and/or some other factor. Alternatively, the controller 104 can receive a communication from another component (e.g., a controller of the appliance system 135, operation of the switch 152) that the outage has ended and follow appropriate protocols 132 based on that communication. In some cases, the controller 104 controls the position of the switch 152 so that reserve power can no longer flow therethrough when normal operations have resumed. In other cases, some other component of the appliance 170 controls the position of the switch 152.

In step 786, reserve power is again stored during resumed normal operations. The reserve power can be stored in one or more energy storage devices 136 using power received from the power source 145 and/or the power supply 140. Control of the amount of power stored, the rate at which power is stored, and any other relevant factors associated with this step 781 can be provided by the controller 104. As discussed above, normal operations can be any time where there is not a voluntary or involuntary outage of the power source 145 and/or the power supply 140. Once step 786 is complete, then the method 779 can end at the END step. Alternatively, when step 786 is complete, the method 779 can revert to one of the previously-described steps (e.g., step 782).

Example embodiments provide a UPS integrated with an appliance to provide reserve power during any type of outage. Example embodiments can be integrated with an appliance upon manufacturing or as an after-market modification to the appliance. Example embodiments can enhance the performance of the UPS and/or the appliance during an outage using measurements made by one or more sensors to provide such benefits as energy efficiency, extended useful life, and more efficient allocation of resources. In some cases, a UPS of an appliance can also provide reserve power and control to one or more other appliances during an outage. An example UPS can be configurable and expandable, accepting energy storage devices (e.g., batteries) of multiple sizes, shapes, voltage capacity, and technology.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A water heater comprising:
a housing;
a heating system disposed within the housing, wherein the heating system is configured to heat a fluid;
an energy metering module configured to (i) detect an energy consumption of the water heater and (ii) output energy data;
a switch coupled to the heating system, wherein the switch operates between a first position during normal operations and a second position during an outage;
a primary power source coupled to the switch, wherein the primary power source is configured to provide primary power to the heating system through the switch during the normal operations;
an uninterruptible power supply (UPS) coupled to the switch, wherein the UPS is configured to provide reserve power to the heating system through the switch during the outage; and a controller in communication with the energy metering module and the UPS, the controller being configured to:
   determine that an outage is occurring or will occur based on data received from the energy metering module; and
   implement an energy conservation mode in response to determining that the reserve power is not actively being provided by the UPS by outputting instructions for one or more components of the UPS to transition from a normal operation mode.

2. The water heater of claim 1, wherein the transitioning from the normal operation mode comprises transitioning to a standby mode.

3. The water heater of claim 1, wherein the transitioning from the normal operation mode comprises powering off.

4. The water heater of claim 1, wherein the UPS comprises at least one energy storage device coupled to at least one energy storage device receiver, wherein the at least one energy storage device is configured to deliver the reserve power to the heating system during the outage.

5. The water heater of claim 4, wherein the at least one energy storage device is rechargeable, wherein the at least one energy storage device is charged using the primary power from the primary power source.

6. The water heater of claim 4, wherein the at least one energy storage device is removable from the at least one energy storage device receiver.

7. The water heater of claim 4, wherein the at least one energy storage device is removable from the at least one energy storage device receiver.

8. The water heater of claim 5, wherein the at least one energy storage device has one or more first characteristics, wherein the at least one energy storage device is replaceable by at least one alternative energy storage device having one or more second characteristics different from the one or more first characteristics.

9. The water heater of claim 8, wherein the first characteristics comprise at least one of a first shape, a first size, a first capacity, or a first battery chemistry, and wherein the second characteristics comprise at least one of a second shape, a second size, a second capacity, or a second battery chemistry.

10. The water heater of claim 1, further comprising:
   a connection port disposed in the housing, wherein the UPS is coupled to the connection port, wherein the UPS is further configured to provide the reserve power to the connection port during an outage.

11. The water heater of claim 1, wherein the controller is further configured to effect a purge of fluid in pipes connected to the water heater.

12. An appliance system comprising:
   a housing;
   an appliance system disposed, at least in part, within the housing;
   an energy metering module configured to detect an energy consumption of the appliance system and output energy data;
   a switch coupled to the appliance system, wherein the switch operates between a first position during normal operations and a second position during an outage;
   a primary power source coupled to the switch, wherein the primary power source is configured to provide primary power to the appliance system through the switch during the normal operations;
   an uninterruptible power supply (UPS) coupled to the switch, wherein the UPS is configured to provide reserve power to the appliance system through the switch during the outage; and
   a controller in communication with the energy metering module and the UPS, the controller being configured to:
      determine that an outage is occurring or will occur based on data received from the energy metering module; and
      receive sensor data from one or more sensors associated with an appliance;
      in response to determining, based on the sensor data, that the appliance is operating, output instructions for the UPS to operate for a predetermined time.

13. The appliance system of claim 12, wherein the controller is further configured to:
   determine that the appliance is in standby mode based at least in part on power data received from the energy metering module; and
   implement an energy conservation mode in response to determining that reserve power is not actively being provided by the UPS by outputting instructions for one or more components of the UPS to transition a standby mode or to power off.

14. The appliance system of claim 13, wherein the controller is further configured to:
   in response to (i) the UPS being in the standby mode or powered off and (ii) determining, based on the sensor data, that the appliance requires the reserve power from the UPS, output instructions for the UPS to transition to a normal operation mode.

15. The appliance system of claim 12, wherein the controller is further configured to:
   determine, based at least in in part on the sensor data, that the appliance requires a temporary boost of energy; and
   output instructions for the UPS to provide sufficient reserve energy to provide the temporary boost of energy required by the appliance.

16. The appliance system of claim 12, wherein the controller is further configured to:
   determine current loading conditions based at least in part on the sensor data; and
   adjust a power factor of the UPS based on the current loading conditions.

17. The appliance of claim 12, wherein the appliance system comprises a heating system, and wherein the appliance comprises a tankless water heater.

18. A water heater comprising:
   a housing;
   a heating system disposed within the housing, wherein the heating system is configured to heat a fluid;
   an energy metering module configured to (i) detect an energy consumption of the water heater and (ii) output energy data;
   a switch coupled to the heating system, wherein the switch operates between a first position during normal operations and a second position during an outage;
   a primary power source coupled to the switch, wherein the primary power source is configured to provide primary power to the heating system through the switch during the normal operations;
   an uninterruptible power supply (UPS) coupled to the switch, wherein the UPS is configured to provide reserve power to the heating system through the switch during the outage; and
   a controller in communication with the energy metering module and the UPS, the controller being configured to:

determine that an outage is occurring based on data received from the energy metering module; and determine that an amount of available reserve power is below a predetermined threshold; and output instructions for purging water from pipes in fluid communication with the water heater, thereby preventing freezing of water within the pipes.

19. The water heater of claim 18, wherein the controller is further configured to:

implement an energy conservation mode in response to determining that the reserve power is not actively being provided by the UPS by outputting instructions for one or more components of the UPS to transition from a normal operation mode.

* * * * *